US012741566B2

(12) United States Patent
Baik et al.

(10) Patent No.: US 12,741,566 B2
(45) Date of Patent: Sep. 22, 2026

(54) METHOD FOR CONTROLLING FUEL CELL OF FUEL CELL VEHICLE

(71) Applicants: Hyundai Motor Company, Seoul (KR); Kia Corporation, Seoul (KR)

(72) Inventors: Seung Won Baik, Suwon (KR); Jong Bin Kang, Incheon (KR); Sang Beom Lee, Gimpo (KR); Ki Chang Kim, Seoul (KR); Seung Min Song, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 960 days.

(21) Appl. No.: 18/076,048

(22) Filed: Dec. 6, 2022

(65) Prior Publication Data

US 2024/0025302 A1 Jan. 25, 2024

(30) Foreign Application Priority Data

Jul. 20, 2022 (KR) ........................ 10-2022-0089630

(51) Int. Cl.
*B60L 58/31* (2019.01)
*H01M 8/0432* (2016.01)
*H01M 8/04955* (2016.01)

(52) U.S. Cl.
CPC ......... *B60L 58/31* (2019.02); *H01M 8/04358* (2013.01); *H01M 8/04955* (2013.01); *H01M 2250/20* (2013.01)

(58) Field of Classification Search
CPC ......... H01M 8/04225; H01M 8/04228; H01M 8/043; H01M 8/04302; H01M 8/04303; H01M 8/04358; H01M 8/04552; H01M 8/04559; H01M 8/04582; H01M 8/04589; H01M 8/04611; H01M 8/04619; H01M 8/04671; H01M 8/04679; H01M 8/04873; H01M 8/0488; H01M 8/04902; H01M 8/0491; H01M 8/08932; H01M 8/0494; H01M 8/04955; H01M 8/0432; H01M 8/04992; H01M 2250/20; B60L 58/31; B60L 58/33; B60L 58/30; B60L 2240/36; B60L 2240/66; B60L 2260/44; B60L 2260/42; B60L 3/0053
See application file for complete search history.

(56) References Cited

U.S. PATENT DOCUMENTS

2012/0015271 A1* 1/2012 Shigezumi ........ H01M 8/04701 429/432
2021/0075044 A1 3/2021 Tanimoto et al.

FOREIGN PATENT DOCUMENTS

| | | | |
|---|---|---|---|
| JP | 2005-071797 | A | 3/2005 |
| JP | 2008-269813 | A | 11/2008 |
| JP | 2019-068703 | A | 4/2019 |
| JP | 2019068703 | * | 4/2019 |

(Continued)

*Primary Examiner* — Matthew W Van Oudenaren
(74) *Attorney, Agent, or Firm* — Fox Rothschild LLP

(57) ABSTRACT

Disclosed is a method for controlling a fuel cell of a fuel cell vehicle. The method comprises determining a reference output required for restarting or stopping power generation of a fuel cell according to a required output of a vehicle, correcting the reference output based on vehicle driving condition information comprising a vehicle altitude and coolant temperature and degree of degradation of the fuel cell, and restarting or stopping the power generation of the fuel cell based on the corrected reference output.

18 Claims, 4 Drawing Sheets

(56) References Cited

FOREIGN PATENT DOCUMENTS

| | | | |
|---|---|---|---|
| KR | 100811806 | B1 | 3/2008 |
| KR | 10-2008-0098531 | A | 11/2008 |
| KR | 10-2010-0001390 | A | 1/2010 |
| KR | 1020160142551 | * | 12/2016 |
| KR | 10-2021-0073707 | A | 6/2021 |
| KR | 10-2021-0076288 | A | 6/2021 |

* cited by examiner

FIG. 2 start

Figure 2:
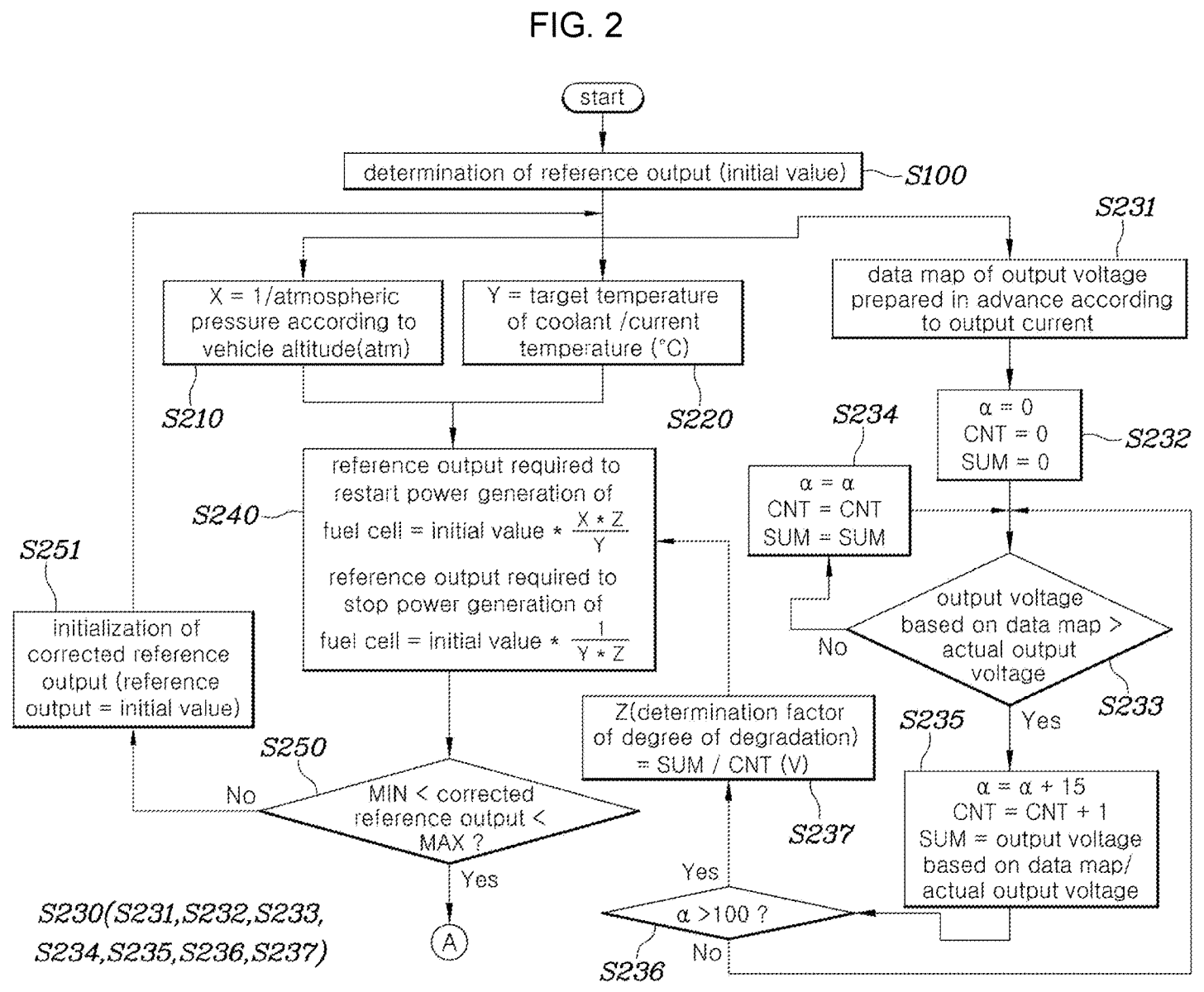

S100 determination of reference output (initial value)

S210 X = 1/atmospheric pressure according to vehicle altitude(atm)

S220 Y = target temperature of coolant /current temperature (°C)

S231 data map of output voltage prepared in advance according to output current

S232 α = 0 CNT = 0 SUM = 0

S233 output voltage based on data map > actual output voltage

Yes

No

S234 α = α CNT = CNT SUM = SUM

S235 α = α + 15 CNT = CNT + 1 SUM = output voltage based on data map/ actual output voltage

S236 α >100 ?

Yes

No

S237 Z(determination factor of degree of degradation) = SUM / CNT (V)

S240 reference output required to restart power generation of fuel cell = initial value * $\frac{X * Z}{Y}$ reference output required to stop power generation of fuel cell = initial value * $\frac{1}{Y * Z}$ S250 MIN < corrected reference output < MAX ?

Yes

A

No

S251 initialization of corrected reference output (reference output = initial value)

S230(S231,S232,S233, S234,S235,S236,S237)

METHOD FOR CONTROLLING FUEL CELL OF FUEL CELL VEHICLE

CROSS REFERENCE TO RELATED APPLICATION(S)

The present application claims, under 35 U.S.C. § 119(a), the benefit of Korean Patent Application No. 10-2022-0089630, filed on Jul. 20, 2022, the disclosure of which is incorporated herein by reference in its entirety.

BACKGROUND

Technical Field

Embodiments of the present disclosure relate to a method for controlling a fuel cell of a fuel cell vehicle and, more particularly, to a method for controlling a fuel cell of a fuel cell vehicle configured to minimize unnecessary stops and restarts by correcting a reference output required for restarting or stopping the power generation of the fuel cell based on vehicle driving condition information comprising vehicle altitude and coolant temperature and the degree of degradation of the fuel cell.

Background

Recently, due to environmental issues of internal combustion engine vehicles, the spread of eco-friendly vehicles, such as electric vehicles, is expanding. In general, an electric vehicle (EV) refers to a vehicle driven by using the driving force of a motor driven by electric energy.

As these electric vehicles, there are a hybrid electric vehicle (HEV) that provides driving power to a motor using the electric energy charged in a vehicle high-voltage battery together with an existing internal combustion engine, a fuel cell electric vehicle (FCEV) that provides driving force to motor using the electric energy generated through a fuel cell, and the like.

In particular, a fuel cell mounted on a fuel cell vehicle refers to a device that receives hydrogen and air from an outside and generates electrical energy through an electrochemical reaction inside a fuel cell stack.

A fuel cell system applied to a fuel cell vehicle comprises a fuel cell stack in which a plurality of fuel cells used as a power source is stacked, a fuel supply system that supplies hydrogen as fuel to the fuel cell stack, and an air supply system that supplies oxygen, an oxidizing agent required for the electrochemical reaction, and a thermal management system that uses coolant and the like to control the temperature of the fuel cell stack.

The fuel supply system depressurizes the compressed hydrogen inside a hydrogen tank and supplies it to the anode (fuel electrode) of the fuel cell stack, and the air supply system operates an air compressor to supply inhaled outdoor air to the cathode (air electrode) of the fuel cell stack.

When hydrogen is supplied to the anode of the fuel cell stack, the oxidation reaction of hydrogen occurs at the anode to generate protons and electrons, and the generated protons and electrons move to the cathode through an electrolyte membrane and a separator, respectively. At the cathode, water is generated through the electrochemical reaction of the protons and electrons moved from the anode and the oxygen in the air, and the flow of these electrons generates electric energy.

On the other hand, if an fault occurs in the power system of the fuel cell system while the fuel cell is being driven, degradation of the electrode of the fuel cell may occur or thermal damage may occur to various equipment of a mechanical balance of plant (MBOP).

Accordingly, a conventional fuel cell system is controlled to urgently stop the power generation of the fuel cell in the above situation. Also, unless there is a fatal defect that makes it impossible to drive the fuel cell in the state of stopping the fuel cell, the power generation of the fuel cell is controlled to restart when the torque required by the driver of the vehicle exceeds a reference torque.

Specifically, when the driver of the vehicle depresses an accelerator pedal and the required torque of the vehicle according to the accelerator pedal opening value measured by an accelerator pedal sensor exceeds or is less than a reference torque, power generation of the fuel cell is controlled to restart or stop.

That is, whether to stop or restart the power generation of the fuel cell is determined based on a preset reference value. However, in the case of such control, a number of problems are caused as follows.

First, since the degree of degradation of the fuel cell is not taken into account, there is a problem in that the degradation is accelerated and the performance and lifespan of the fuel cell are rapidly reduced. Each of the plurality of fuel cells constituting the fuel cell stack has a unique performance and current generation region.

However, if the performance of one cell or several cells is degraded due to the aging of the fuel cell stack due to the long-term use of the fuel cell, each cell becomes unable to generate additional current. If current generation of the entire stack is forcibly permitted in such a state, a rapid additional performance degradation occurs in cells whose performance has already degraded compared to other cells.

Second, since it is controlled according to a preset reference value, there is a problem in that durability and efficiency of the fuel cell are degraded as the power generation of the fuel cell is frequently stopped and restarted.

The current generated in the fuel cell stack may be discharged to the driving motor of the vehicle after being charged in the battery, or may be directly supplied to the driving motor of the vehicle. In view of this, currently a commercial fuel cell vehicle performs the upper limit voltage control of the fuel cell in order to secure the durability of the fuel cell in general.

However, when the power generation of the fuel cell is frequently stopped and restarted, the amount of power charged in the battery increases due to the upper limit voltage control. Accordingly, when the battery is fully charged, the control of the upper limit voltage of the fuel cell is released, which may adversely affect the durability of the fuel cell.

In addition, the fuel cell has a characteristic that durability and efficiency are degraded when there is a difference in the amount of gas respectively supplied to the cathode and the anode. Specifically, when the power generation of the fuel cell is restarted, air is momentarily supercharged to match an air supply speed. Accordingly, there is a difference in the amount of gas respectively supplied to the anode and the cathode, thereby accelerating degradation. In addition, since the rotational speed of the air compressor increases for supercharging the air, the power consumption of the air compressor increases, thereby reducing the efficiency of the overall fuel cell system.

Third, in a situation where air supercharging is required, unnecessary fuel cell power generation may be restarted.

As the altitude of the fuel cell vehicle increases, the oxygen contained in the outdoor air decreases, so it is necessary to supercharge the air according to the altitude increase while the fuel cell vehicle is driving. When the power generation of the fuel cell is restarted in a situation in which air supercharging is required, incomplete power generation may occur due to a limitation in the amount of air, and the durability of the fuel cell may be adversely affected due to the excessive air.

Accordingly, there is an urgent need to provide a technology capable of stopping or restarting the power generation of the fuel cell by reflecting the degree of degradation of the fuel cell described above while minimizing unnecessary stop and restart.

The matters described as the background art above are only for improving the understanding of the background of the present disclosure, and should not be accepted as acknowledging that they correspond to the existing technologies known to those of ordinary skill in the art.

SUMMARY

The present disclosure has been proposed to solve at least the above problems, and an object of the present disclosure is to provide a method for controlling a fuel cell of a fuel cell vehicle configured to minimize unnecessary stops and restarts by correcting a reference output required for restarting or stopping the power generation of the fuel cell based on vehicle driving condition information comprising vehicle altitude and coolant temperature and the degree of degradation of the fuel cell.

In order to achieve the above object, a method for controlling a fuel cell of a fuel cell vehicle according to the present disclosure is provided. The method may comprise determining a reference output required for restarting or stopping power generation of a fuel cell according to a required output of a vehicle, correcting the reference output based on vehicle driving condition information and degree of degradation of the fuel cell, and restarting or stopping the power generation of the fuel cell based on the corrected reference output.

In the determining a reference output of the method for controlling a fuel cell of a fuel cell vehicle according to the present disclosure, the reference output required for restarting or stopping the power generation of the fuel cell may be determined based on a first data map prepared in advance according to the required output of the vehicle.

In the correcting the reference output of the method for controlling a fuel cell of a fuel cell vehicle according to the present disclosure, a correction value of the reference output may be determined based on the vehicle driving condition information including vehicle altitude and coolant temperature and the degree of degradation of the fuel cell, and the reference output may be corrected based on the determined correction value.

As for the correction value of the reference output in the correcting the reference value of the method for controlling a fuel cell of a fuel cell vehicle according to the present disclosure, the correction value of the reference output required for restarting the power generation of the fuel cell and the correction value of the reference output required for stopping the power generation of the fuel cell may be individually determined.

In the correcting the reference output of the method for controlling a fuel cell of a fuel cell vehicle according to the present disclosure, the correction value of the reference output required for restarting the power generation of the fuel cell may be determined based on Equation 1 below.

$$\text{Correction value of reference output required for restarting power generation of fuel cell} = \frac{X \times Z}{Y} \quad \text{Equation 1}$$

$$X = \frac{1}{\text{Atmospheric pressure (atm) according to vehicle altitude}}$$

$$Y = \frac{\text{Target temperature of coolant (° C.)}}{\text{Current temperature of coolant (° C.)}}$$

$$Z = \text{Determination factor of degree of degradation of fuel cell (V)}$$

In the correcting the reference output of the method for controlling a fuel cell of a fuel cell vehicle according to the present disclosure, the correction value of the reference output required for stopping the power generation of the fuel cell may be determined based on Equation 2 below.

$$\text{Correction value of reference output required for stopping power generation of fuel cell} = \frac{1}{Y \times Z} \quad \text{Equation 2}$$

$$Y = \frac{\text{Target temperature of coolant (° C.)}}{\text{Current temperature of coolant (° C.)}}$$

$$Z = \text{Determination factor of degree of degradation of fuel cell (V)}$$

In the correcting the reference output of the method for controlling a fuel cell of a fuel cell vehicle according to the present disclosure, the determination factor of the degree of degradation of the fuel cell may be calculated based on the data map of an output voltage prepared in advance according to the output current of the fuel cell.

In the correcting the reference output of the method for controlling a fuel cell of a fuel cell vehicle according to the present disclosure, the output voltage based on the data map of the output voltage prepared in advance may be compared with an actual output voltage of the fuel cell; and when the actual output voltage of the fuel cell is lower than the output voltage based on the data map of the output voltage prepared in advance, the determination factor of the degree of degradation of the fuel cell may be calculated by calculating a rate of the actual output voltage of the fuel cell to the output voltage based on the data map of the output voltage prepared in advance.

In the correcting the reference output of the method for controlling a fuel cell of a fuel cell vehicle according to the present disclosure, each time the actual output voltage of the fuel cell is lower than the output voltage based on the data map of the output voltage prepared in advance, a number of counts may be increased; for each count, the ratio of the actual output voltage of the fuel cell to the output voltage based on the data map of the output voltage prepared in advance may be calculated and summed; when the number of counts reaches a preset reference number, the determination factor of the degree of degradation of the fuel cell may be calculated by dividing the summation result by the number of counts.

In the correcting the reference output of the method for controlling a fuel cell of a fuel cell vehicle according to the present disclosure, when the corrected reference output is out of a preset reference range, the corrected reference output may be initialized.

The restarting or stopping the power generation of the fuel cell of the method for controlling a fuel cell of a fuel cell vehicle according to the present disclosure may comprise determining whether it is required to restart or stop the power generation of the fuel cell according to a driving state of the fuel cell and a difference between the required output of the vehicle and the corrected reference output; calculating an integral value by integrating the difference between the required output of the vehicle and the corrected reference output during a time when the power generation of the fuel cell is restarted or stopped when it is determined that it is required to restart or stop the power generation of the fuel cell; and restarting or stopping the power generation of the fuel cell based on the calculated integral value.

In the determining whether it is required to start or stop the power generation of the fuel cell of the method for controlling a fuel cell of a fuel cell vehicle according to the present disclosure, when the fuel cell is in a stopped state but the required output of the vehicle is greater than the corrected reference output, it may be determined that it is required to restart the power generation of the fuel cell, and when the fuel cell is in a driving state but the required output of the vehicle is less than the corrected reference output, it may be determined that it is required to stop the power generation of the fuel cell.

In the determining whether it is required to restart or stop the power generation of the fuel cell of the method for controlling a fuel cell of a fuel cell vehicle according to the present disclosure, when it is determined that it is not required to restart or stop the power generation of the fuel cell, the integral value derived from the calculating the integral value may be initialized.

In the determining whether it is required to restart or stop the power generation of the fuel cell of the method for controlling a fuel cell of a fuel cell vehicle according to the present disclosure, the power generation of the fuel cell may be restarted when the calculated integral value is greater than a preset first reference value, and it may be re-determined whether it is required to restart or stop the power generation of the fuel cell when the calculated integral value is less than the preset first reference value.

In the restarting or stopping the power generation of the fuel cell of the method for controlling a fuel cell of a fuel cell vehicle according to the present disclosure, the power generation of the fuel cell may be stopped when the calculated integral value is less than a preset second reference value, and it may be re-determined whether it is required to restart or stop the power generation of the fuel cell when the calculated integral value is greater than the preset second reference value.

According to the method for controlling a fuel cell of a fuel cell vehicle of the present disclosure, the following effects are obtained.

First, the performance and lifespan of the fuel cell can be improved by minimizing the degradation speed of the fuel cell by stopping or restarting the power generation of the fuel cell by reflecting the degree of degradation of the fuel cell.

Second, it is possible to improve the durability and efficiency of the fuel cell by minimizing unnecessary stop and restart by stopping or restarting the power generation of the fuel cell based on the integral value obtained by integrating the difference between the required output of the vehicle and the corrected reference output.

The fuel cell vehicle of the present disclosure may, e.g., comprise one or more components or complete systems of fuel cell vehicles as disclosed in one or more of U.S. Published Patent Application 2020/0369165; U.S. Published Patent Application 2022/0194235; and/or U.S. Published Patent Application 2022/0194234.

Other aspects are disclosed infra,

BRIEF DESCRIPTION OF THE DRAWINGS

FIG. 2 is a flowchart showing a step of correcting a reference output in a method for controlling a fuel cell of a fuel cell vehicle according to an exemplary embodiment of the present disclosure.

DETAILED DESCRIPTION

Figure 1:
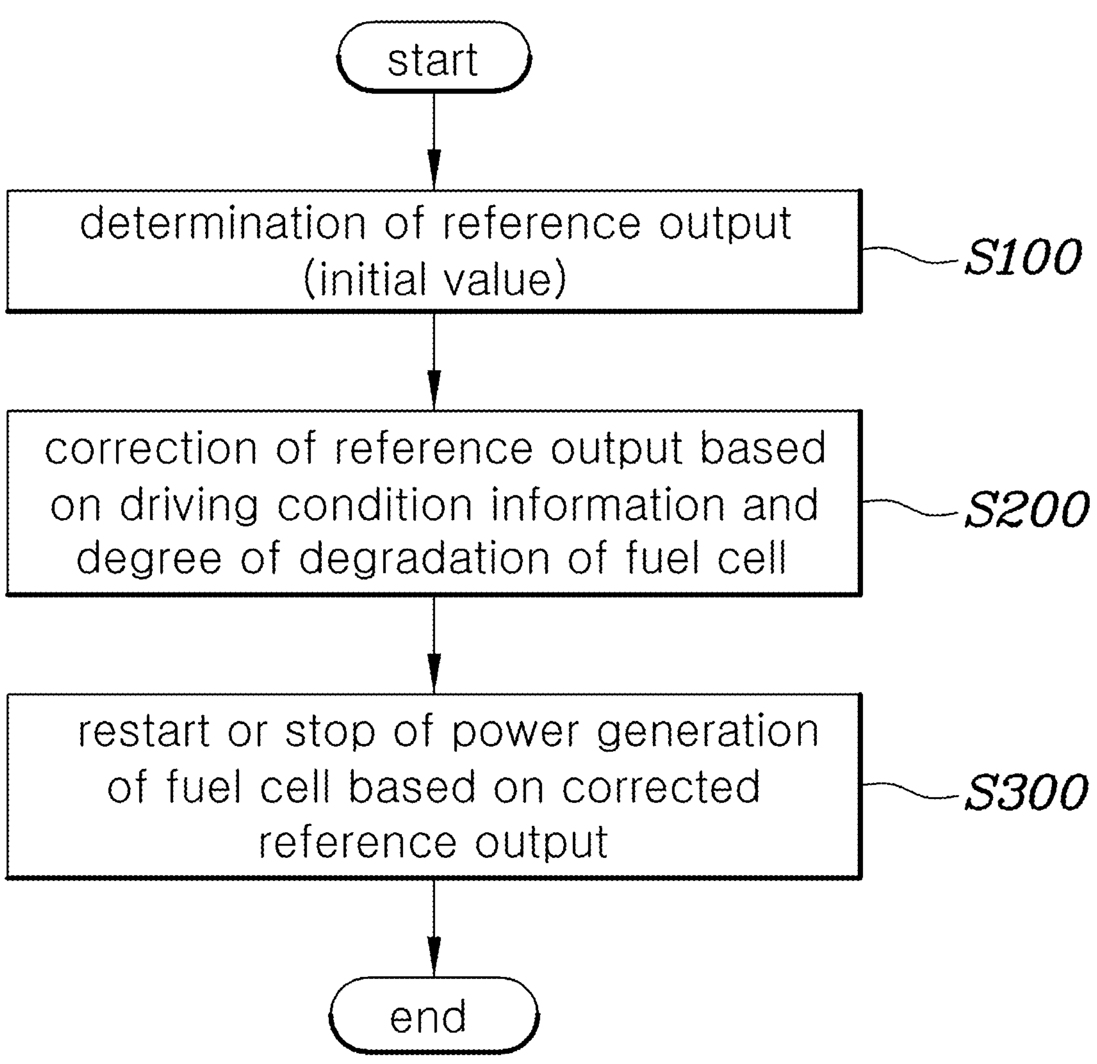
FIG. 1 is a flowchart of a method for controlling a fuel cell of a fuel cell vehicle according to an exemplary embodiment of the present disclosure.

Throughout this specification, terms such as "comprises" or "have" are intended to designate the presence of a feature, number, step, operation, component, part, or combination thereof described in the specification, but it is to be understood that this does not preclude the possibility of addition or presence of one or more other features or numbers, steps, operations, components, parts, or combinations thereof.

Also, terms including an ordinal number, such as first, second, etc., may be used to describe various components, but the components are not limited by the terms. The above terms are used only for the purpose of distinguishing one component from another component.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

In describing the embodiments disclosed in the present specification, if it is determined that detailed descriptions of related known technologies may obscure the gist of the embodiments disclosed in this specification, the detailed description thereof will be omitted. In addition, the accompanying drawings are only for easy understanding of the embodiments disclosed in the present specification, and the technical spirit disclosed herein is not limited by the accompanying drawings, and it should be understood to include all modifications, equivalents and substitutes included in the spirit and scope of the present disclosure.

Hereinafter, the configuration and working principle of various embodiments of the disclosed disclosure will be described in detail with reference to the accompanying drawings. In the drawings, the same reference numerals will be used throughout to designate the same or equivalent elements. In addition, a detailed description of well-known features or functions will be ruled out in order not to unnecessarily obscure the gist of the present disclosure.

Figure 3:
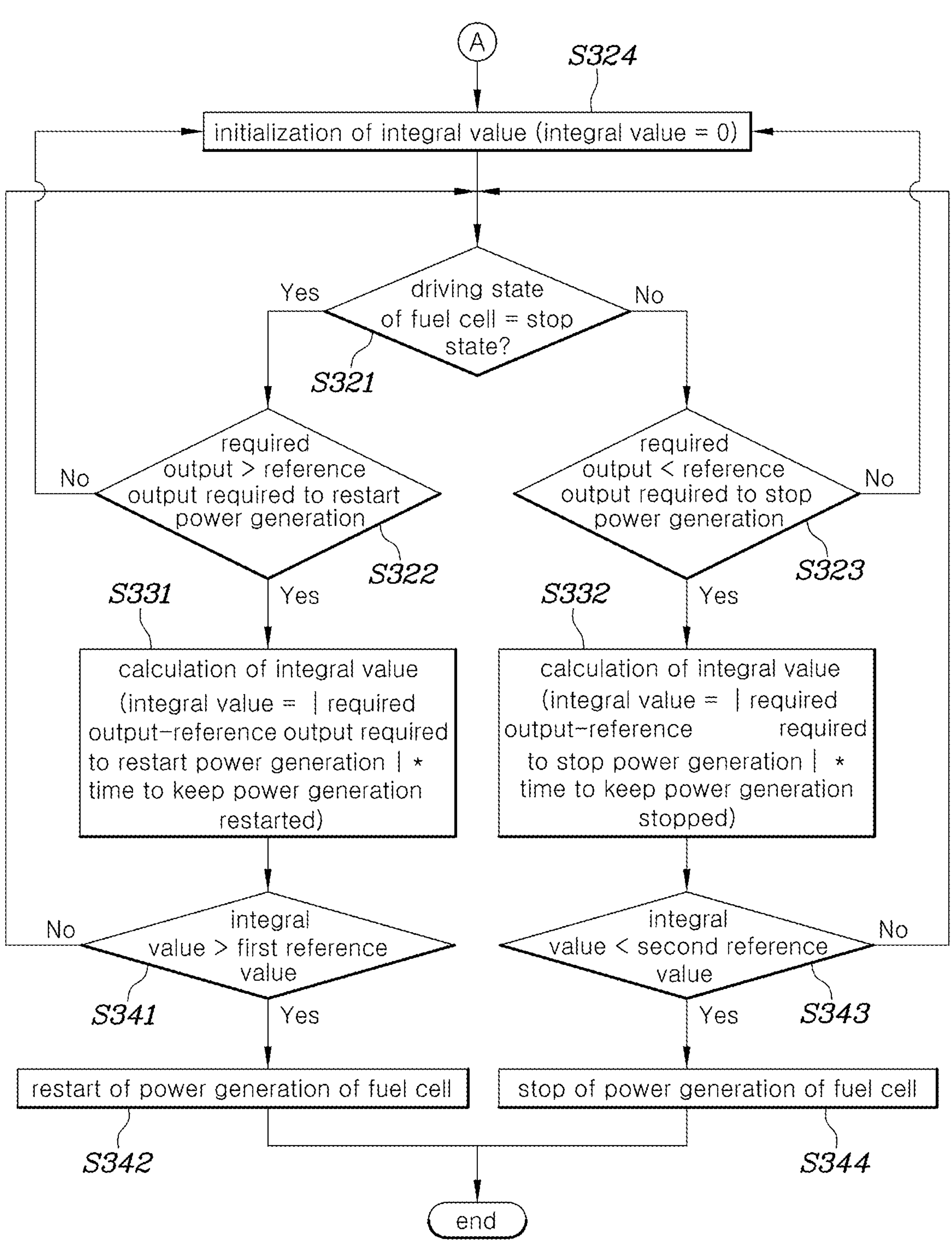
FIG. 3 is a flowchart showing a step of restarting or stopping power generation of a fuel cell in a method for controlling a fuel cell of a fuel cell vehicle according to an exemplary embodiment of the present disclosure.
Figure 4:
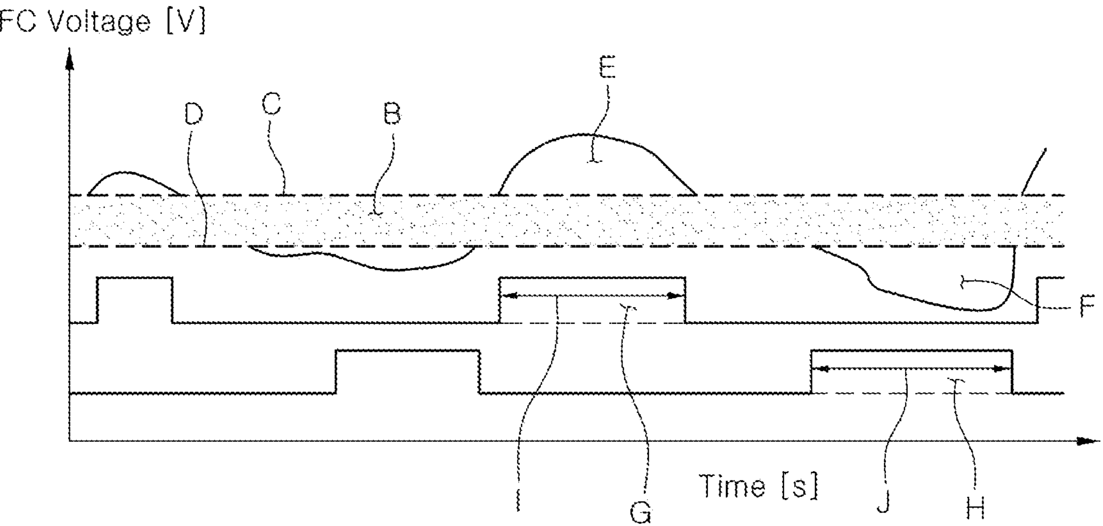
FIG. 4 is a diagram for describing an integral value obtained by integrating a reference output range and a difference between a requested output of a vehicle and a corrected reference output.

FIG. 1 is a flowchart of a method for controlling a fuel cell of a fuel cell vehicle according to an exemplary embodiment of the present disclosure, FIG. 2 is a flowchart showing a step of correcting a reference output in a method for controlling a fuel cell of a fuel cell vehicle according to an exemplary embodiment of the present disclosure, FIG. 3 is a flowchart showing a step of restarting or stopping power generation of a fuel cell in a method for controlling a fuel cell of a fuel cell vehicle according to an exemplary embodiment of the present disclosure, FIG. 4 is a diagram for describing an integral value obtained by integrating a reference output range and a difference between a requested output of a vehicle and a corrected reference output.

Referring to FIG. 1, a method for controlling a fuel cell of a fuel cell vehicle according to the present disclosure includes the steps of determining a reference output required for restarting or stopping power generation of a fuel cell according to a required output of the vehicle (S100), correcting the reference output based on vehicle driving condition information including vehicle altitude and coolant temperature and degree of degradation of the fuel cell (S200) and restarting or stopping power generation of the fuel cell based on the corrected reference output (S300).

In order to help the understanding of the present disclosure, a conventional method for controlling power generation of a fuel cell in a fuel cell system will be briefly reviewed, and then, key features of each step of the present disclosure will be individually reviewed.

As described in the background art, the conventional fuel cell system determines whether to stop and restart the power generation of the fuel cell based on a preset reference value. Here, it may be understood that the preset reference value corresponds to the 'reference output required for restarting or stopping the power generation of the fuel cell according to the required output of the vehicle (hereinafter, it is preferable to understand the same meaning even when expressed as 'reference output')' in the present disclosure.

Referring to FIG. 4 in more detail, region B in FIG. 4 represents a reference output range. That is, C, an upper limit value of region B, refers to a reference output required to restart the power generation of the fuel cell, and D, a lower limit value of region B, refers to a reference output required to stop the power generation of the fuel cell.

In the conventional fuel cell system, the power generation of the fuel cell is controlled to be restarted when the required output of the vehicle increases and exceeds the reference output (C) required for restarting the power generation of the fuel cell. In addition, the power generation of the fuel cell is controlled to be stopped when the required output of the vehicle decreases and is lower than the reference output (D) required for stopping the power generation of the fuel cell.

In addition, in the method for controlling a fuel cell of a fuel cell vehicle according to the present disclosure, the reference output derived in the step (S100) of determining the reference output required for restarting or stopping the power generation of the fuel cell according to the required output of the vehicle can be understood as being identical to the constant reference values (C, D) used in the conventional fuel cell system.

Specifically, in the step (S100) of determining the reference output of the method for controlling a fuel cell of a fuel cell vehicle according to the present disclosure, it may determine the reference output required for restarting or stopping the power generation of the fuel cell based on a first data map prepared in advance according to the required output of the vehicle.

Here, the 'first data map prepared in advance' is an experimental value related to the reference output of the fuel cell derived through a plurality of experiments according to the required output of the vehicle, and may be stored as data in advance.

That is, in the step of determining the reference output of the method for controlling a fuel cell of a fuel cell vehicle according to the present disclosure (S100), the reference output of the fuel cell is derived based on a preset experimental value.

However, if it is simply determined whether the power generation of the fuel cell is stopped or restarted based on a preset reference value, there is a problem in that the performance and lifespan of the fuel cell are rapidly degraded.

Accordingly, in the method for controlling a fuel cell of a fuel cell vehicle according to the present disclosure, the reference output of the fuel cell derived in step (S100) is corrected, and the power generation of the fuel cell is restarted or stopped based on the corrected reference output. This is represented by S200 and S300 in FIG. 1.

Here, the 'correction of the reference output' may be understood as correcting the reference output (C) required for restarting the power generation of the fuel cell and the reference output (D) required for stopping the power generation of the fuel cell in FIG. 4. Thus, variable control for increasing or decreasing the reference output range (region B) is performed.

Specifically, the method for controlling a fuel cell of a fuel cell vehicle according to the present disclosure can variably control the reference output range (region B) by correcting the reference output based on the vehicle driving condition information and the degree of degradation of the fuel cell.

In this case, the vehicle driving condition information includes information about vehicle altitude and coolant temperature.

As the altitude of the fuel cell vehicle increases, the oxygen contained in the outdoor air decreases, so it is necessary to supercharge the air according to the altitude increase while the fuel cell vehicle is driving. When the power generation of the fuel cell is restarted in a situation in which air supercharging is required, incomplete power generation may occur due to a limitation in the amount of air, and the durability of the fuel cell may be adversely affected due to the excessive air.

Therefore, in the method for controlling a fuel cell of a fuel cell vehicle according to the present disclosure, the reference output of the fuel cell is derived in consideration of the effect of the vehicle altitude. Accordingly, it is possible to prevent the power generation of the fuel cell from being restarted more frequently than necessary in a situation where air supercharging is required, and there is an advantage in that the durability of the fuel cell can be secured.

On the other hand, when the current temperature of the coolant for preventing overheating of the fuel cell is lower than the target temperature of the coolant, the temperature of the coolant needs to be increased. In the opposite case, the power generation of the fuel cell should be stopped to secure cooling time.

Specifically, when the current temperature of the coolant is lower than the target temperature of the coolant, the reference output (C) required for restarting the power generation of the fuel cell is increased and the reference output (D) required for stopping the power generation of the fuel cell is lowered, so that the reference output range (B) can be controlled to increase.

In addition, when the current temperature of the coolant is higher than the target temperature of the coolant, the reference output (C) required for restarting power generation of the fuel cell is lowered and the reference output (D) required for stopping the power generation of the fuel cell is increased, so that the reference output range (region B) can be controlled to decrease.

In addition, the rate of degradation due to the use of the fuel cell tends to be gradually accelerated, and accordingly, the performance and lifespan of the fuel cell are rapidly degraded. In addition, as the power generation of the fuel cell is restarted and stopped more frequently, the degradation of the fuel cell is further accelerated.

Accordingly, the method for controlling a fuel cell of a fuel cell vehicle according to the present disclosure is to minimize unnecessary restart or stop of the power generation of the fuel cell by variably controlling the reference output range in consideration of the degree of degradation of the fuel cell.

Hereinafter, the step (S200) of correcting the reference output of the method for controlling a fuel cell of a fuel cell vehicle according to the present disclosure will be described in more detail with reference to FIG. 2.

FIG. 2 is a flowchart showing the step (S200) of correcting a reference output in a method for controlling a fuel cell of a fuel cell vehicle according to an exemplary embodiment of the present disclosure.

Referring to FIG. 2, in the step (S200) of correcting the reference output of the method for controlling a fuel cell of a fuel cell vehicle according to the present disclosure, the correction value of the reference output may be determined based on the vehicle driving condition information including the vehicle altitude and the coolant temperature and the degree of degradation of the fuel cell, and the reference output may be corrected based on the determined correction value (S210, S220, S230, and S240). In addition, as for the correction value of the reference output, the correction value of the reference output required for restarting the power generation of the fuel cell and the correction value of the reference output required for stopping the power generation of the fuel cell may be individually determined (S240).

That is, in the method for controlling a fuel cell of a fuel cell vehicle according to the present disclosure, the correction value of the reference output (C in FIG. 4) required for restarting the power generation of the fuel cell and the reference output (D in FIG. 4) required for stopping the power generation of the fuel cell are individually determined, and each reference output is corrected based on the determined correction value, so that the reference output range (region B in FIG. 4) is variably controlled.

This may be understood as further adding a control logic for deriving and correcting the correction value of the reference output to the control logic (which refers to the step of determining the reference output) used in the conventional art.

Therefore, there is an advantage in that the reference output range can be variably controlled only by additionally employing a separate control logic while using the conventional control logic as it is.

Hereinafter, the method of determining the correction value of each reference output will be described in more detail.

First, in the step (S200) of correcting the reference output of the method for controlling a fuel cell of a fuel cell vehicle according to the present disclosure, the correction value of the reference output required for restarting the power generation of the fuel cell may be determined based on Equation 1 below (S240).

$$\text{Correction value of reference output required for restarting power generation of fuel cell} = \frac{X \times Z}{Y} \quad \text{Equation 1}$$

$$X = \frac{1}{\text{Atmospheric pressure (atm) according to vehicle altitude}}$$

-continued $$Y = \frac{\text{Target temperature of coolant (° C.)}}{\text{Current temperature of coolant (° C.)}}$$

$Z$ = Determination factor of degree of degradation of fuel cell (V)

In Equation 1, it is understood that X refers to 'a factor for determining the effect of a vehicle altitude', and Y refers to 'a factor for determining the effect of a coolant temperature.'

The factor (Y) for determining the effect of the coolant temperature and the factor (Z) for determining the degree of degradation of the fuel cell will be described later, and the factor (X) for determining the effect of the vehicle altitude will be described.

As the vehicle altitude increases, the atmospheric pressure decreases, so that the concentration of oxygen contained in the outdoor air of the vehicle decreases. Therefore, in the case of a fuel cell vehicle, it is necessary to increase the flow rate of the air supplied to the cathode through the air compressor in consideration of the oxygen concentration that decreases as the altitude increases.

If the effect of the vehicle altitude on the power generation state of the fuel cell is not taken into account, the air compressor is driven at a relatively high number of rotations (in RPM) when the power generation of the fuel cell is restarted. Therefore, there are problems in that the efficiency of the overall system decreases as the power consumption increases, and the air is supercharged and the degradation of the fuel cell is induced.

Therefore, in the method for controlling a fuel cell of a fuel cell vehicle according to the present disclosure, the fuel cell is maintained in a stable state by calculating the ratio of atmospheric pressure and '1 atm' according to the vehicle altitude and widening the reference output range (region B in FIG. 4).

In other words, as the vehicle altitude increases, the reference output (C in FIG. 4) required for restarting the power generation of the fuel cell is increased, thereby preventing the restart of the power generation of the fuel cell in a low atmospheric pressure situation.

Reviewing this through Equation 1, as the atmospheric pressure decreases when the vehicle altitude rises, the factor (X) for determining the effect of the vehicle altitude increases. Accordingly, since the correction value of the reference output (C in FIG. 4) required for restarting the power generation of the fuel cell increases, the reference output range is finally widened.

Next, in the step of correcting the reference output (S200) of the method for controlling a fuel cell of a fuel cell vehicle according to the present disclosure, the correction value of the reference output required for stopping the power generation of the fuel cell may be determined based on Equation 2 below (S240).

$$\text{Correction value of reference output required for stopping power generation of fuel cell} = \frac{1}{Y \times Z} \qquad \text{Equation 2}$$

$$Y = \frac{\text{Target temperature of coolant (° C.)}}{\text{Current temperature of coolant (° C.)}}$$

$Z$ = Determination factor of degree of degradation of fuel cell (V)

Referring to Equation 2 above, unlike the correction value of the reference output (C of FIG. 4) required for restarting the power generation of the fuel cell, the factor (X) for determining the effect of the vehicle altitude is excluded from the correction value of the reference output (D of FIG. 4) required for stopping the power generation of the fuel cell.

Therefore, the factor (Y) for determining the effect of the coolant temperature will be examined. When the current temperature of the coolant is lower than the target temperature of the coolant, the factor (Y) for determining the effect of the coolant temperature is derived as a relatively large value. When the current temperature of the coolant is higher than the target temperature of the coolant, the factor (Y) for determining the effect of the coolant temperature is derived as a relatively small value.

Accordingly, when the current temperature of the coolant is lower than the target temperature of the coolant, the correction value of the reference output (D of FIG. 4) required for stopping the power generation of the fuel cell is determined to be a relatively large value, whereas when the current temperature of the coolant is higher than the target temperature of the coolant, the correction value of the reference output (D of FIG. 4) required for stopping the power generation of the fuel cell is determined to be a relatively small value.

Then, reviewing Equation 1, when the current temperature of the coolant is lower than the target temperature of the coolant, the correction value of the reference output (C in FIG. 4) required for restarting the power generation of the fuel cell is determined to be a relatively large value. On the other hand, when the current temperature of the coolant is higher than the target temperature of the coolant, the correction value of the reference output (C of FIG. 4) required for restarting the power generation of the fuel cell is determined to be a relatively small value.

Finally, when the current temperature of the coolant is lower than the target temperature of the coolant, the reference output range (region B in FIG. 4) is widened, and when the current temperature of the coolant is higher than the target temperature of the coolant, the reference output range (region B in FIG. 4) becomes narrower.

As a result, the reference output range can be variably controlled by correcting the reference output through the correction value of the reference output determined by the above principle.

Hereinafter, the 'determination factor (Z) of the degree of degradation of the fuel cell' in Equations 1 and 2 will be described in detail.

In the step (S200) of correcting the reference output of the method for controlling a fuel cell of a fuel cell vehicle according to the present disclosure, the determination factor of the degree of degradation of the fuel cell may be calculated based on the data map of the output voltage prepared in advance according to the output current of the fuel cell (S231).

Here, the 'data map of the output voltage prepared in advance according to the output current of the fuel cell' may be prepared based on the I-V characteristic curve of the fuel cell. The I-V characteristic curve of the fuel cell is a curve representing the relationship between the output current and output voltage of the fuel cell, where I refers to the output current of the fuel cell and V refers to the output voltage of the fuel cell.

The I-V characteristic curve changes according to the performance of the fuel cell, and the performance of the fuel cell decreases as the degree of degradation of the fuel cell progresses. Thus, it is possible to determine the degree of degradation of the fuel cell through the tendency of the I-V characteristic curve to change.

That is, in the present disclosure, the 'data map of the output voltage prepared in advance according to the output current' means that the output current and output voltage of the I-V characteristic curve derived for each degree of degradation of the fuel cell are dataized through a number of experiments.

In the method for controlling a fuel cell of a fuel cell vehicle according to the present disclosure, the case where the actual output voltage of the fuel cell is low is counted based on the above-described output voltage based data map, and it is determined that the degradation of the fuel cell has progressed if the number of counts (CNT) is continuously generated for a preset reference count.

Specifically, in the step (S200) of correcting the reference output of the method for controlling a fuel cell of a fuel cell vehicle according to the present disclosure, the output voltage based on the data map of the output voltage prepared in advance is compared with the actual output voltage of the fuel cell (S233). When the actual output voltage of the fuel cell is lower than the output voltage based on the data map of the output voltage prepared in advance, the ratio of the actual output voltage of the fuel cell to the output voltage based on the data map of the output voltage prepared in advance is calculated to obtain the determination factor of the degree of degradation of the fuel cell (S237).

Then, in the step (S200) of correcting the reference output of the method for controlling a fuel cell of a fuel cell vehicle according to the present disclosure, each time the actual output voltage of the fuel cell is lower than the output voltage based on the data map of the output voltage prepared in advance, the number of counts is increased (S235); for each count number, the ratio of the actual output voltage of the fuel cell to the output voltage based on the data map of the output voltage prepared in advance is calculated and summed; when the number of counts reaches a preset reference count, the determination factor of the degree of deterioration of the fuel cell may be calculated by dividing the summation result by the number of counts (S237).

Here, the 'the preset reference count' may be set differently depending on the control condition, and the reason for setting the reference count is as follows.

The actual output voltage of the fuel cell may be temporarily lower than the above described output voltage according to the data map (actual output voltage drop phenomenon of the fuel cell) due to various causes such as a momentary output fault occurring while the fuel cell is being driven, as well as a case in which degradation of the fuel cell has progressed.

That is, when such an output voltage drop phenomenon does not occur temporarily but continuously occurs, it can be determined that the degradation of the fuel cell has progressed.

In addition, in the method for controlling a fuel cell of a fuel cell vehicle according to the present disclosure, the ratio of the actual output voltage of the fuel cell to the output voltage based on the data map of the output voltage prepared in advance is calculated for each number of count (CNT) and summed (SUM). When the number of counts reaches a preset reference count, the summation result is divided by the number of counts (SUM/CNT) to calculate the determination factor of the degree of degradation of the fuel cell.

FIG. 2 shows a case in which the preset reference count is set to 7 as an example. Specifically, in FIG. 2, a separate variable called 'α' is further shown along with the number of counts (CNT) and the summation result (SUM) of the ratio of the output voltage of the fuel cell to the output voltage based on the data map.

'α' corresponds to a separate variable for determining whether the number of counts (CNT) has reached a preset reference count. That is, the initial value of 'α' starts with 0 and 'α' increases by 15 whenever the number of counts (CNT) increases by 1. If 'α' corresponds to a value less than 100, the comparison of the output voltage with the output voltage based on the data map is repeated. When the number of counts (CNT) reaches 7, 'α' becomes '105', which is greater than 100. Therefore, the determination factor (Z) of the degree of degradation of the fuel cell is confirmed without further comparing the output voltage based on the data map with the actual output voltage.

The confirmed determination factor (Z) of the degree of degradation of the fuel cell is used in Equations 1 and 2 mentioned above.

First, referring to Equation 1, it can be seen that the correction value of the reference output (C of FIG. 4) required for restarting the power generation of the fuel cell is proportional to the determination factor (Z) of the degree of degradation of the fuel cell.

The higher the degree of degradation of the fuel cell, the larger the ratio of the output voltage of the fuel cell to the output voltage based on the data map is derived. Thus, the determination factor (Z) of the degree of degradation of the fuel cell that is calculated by dividing the summation result (SUM) by the number of counts (CNT) is similarly derived as a large value. Accordingly, as the degradation degree of the fuel cell increases, the correction value of the reference output (C in FIG. 4) required for restarting the power generation of the fuel cell is determined to be a relatively large value.

Next, referring to Equation 2, it can be seen that the correction value of the reference output (D of FIG. 4) required for stopping the power generation of the fuel cell is inversely proportional to the determination factor (Z) of the degree of degradation of the fuel cell. Accordingly, as the degree of degradation of the fuel cell increases, the correction value of the reference output (D of FIG. 4) required for stopping the power generation of the fuel cell is determined to be a relatively small value.

Accordingly, as the degree of degradation of the fuel cell increases, the reference output range (region B in FIG. 4) is controlled to be widen.

As a result, as the degree of degradation of the fuel cell increases, the reference output range is widened, thereby enabling the fuel cell to maintain a stable state without frequent restart or stop of the power generation.

Meanwhile, in the step (S200) of correcting the reference output of the method for controlling a fuel cell of a fuel cell vehicle according to the present disclosure, when the corrected reference output is out of a preset reference range, the corrected reference output may be initialized (S250, S251).

In the present disclosure, the 'reference output required for restarting or stopping the power generation of the fuel cell according to the required output of the vehicle' corresponds to a preset value that is dataized and stored based on the first data map prepared in advance, as described above.

That is, the reference output is set based on the control purpose according to the requested output, such as a situation in which high or low output is required in controlling the power generation of the fuel cell. Therefore, the reference output can be generally set to certain limit values (maximum value or minimum value) according to the control purpose, which can be changed according to various design conditions.

If the corrected reference output is over-corrected and deviates from the maximum value (MAX in FIG. 2) or minimum value (MIN in FIG. 2) of the reference output, the control purpose cannot be achieved even if the power generation of the fuel cell is controlled according to the corrected reference output.

Therefore, in the method for controlling a fuel cell of a fuel cell vehicle according to the present disclosure, when the corrected reference output is out of a preset reference range, the corrected reference output may be initialized as the reference output before correction.

Here, the 'reference output before correction' may be understood to refer to the reference output (initial value) determined in the step (S100) of determining the reference output required for restarting or stopping the power generation of the fuel cell according to the required output of the vehicle.

As a result, it has an effect of improving the control stability and reliability by preventing a situation in which the reference output is over-corrected.

Hereinafter, a control principle for restarting or stopping the power generation of a fuel cell according to the corrected reference output will be described in detail with reference to FIG. 3.

FIG. 3 is a flowchart showing the step (S300) of restarting or stopping the power generation of the fuel cell in the method for controlling a fuel cell of a fuel cell vehicle according to an exemplary embodiment of the present disclosure.

Referring to FIG. 3, the step (S300) of restarting or stopping the power generation of the fuel cell in the method for controlling a fuel cell of a fuel cell vehicle according to the present disclosure may comprise the steps of determining whether the power generation of the fuel cell is required to be restarted or stopped according to the driving state of the fuel cell and the difference between the required output of the vehicle and the corrected reference output (S321, S322, S323, S324); calculating an integral value by integrating the difference between the required output of the vehicle and the corrected reference output during the time when the power generation of the fuel cell is restarted or stopped when it is determined that it is required to restart or stop the power generation of the fuel cell (S331, S332); and restarting or stopping the power generation of the fuel cell based on the calculated integral value (S341, S342, S343, S344).

In the method for controlling a fuel cell of a fuel cell vehicle according to the present disclosure, when the corrected reference output is determined, the driving state of the fuel cell is checked (S321). When the fuel cell is in the stopped state, it is determined whether it is required to restart the power generation of the fuel cell (S322), and when the fuel cell is in the driving state, it is determined whether it is required to stop the power generation of the fuel cell (S323).

In this case, the required output of the vehicle and the corrected reference output are compared, and the corrected reference output has the following difference.

In determining whether it is required to restart the power generation of the fuel cell, the corrected reference output refers to the reference output (C of FIG. 4) required for restarting the power generation of the fuel cell. On the other hand, in determining whether it is required to stop the power generation of the fuel cell, the corrected reference output refers to the reference output (D of FIG. 4) required for stopping the power generation of the fuel cell.

In the following specification, it is expressed integrally as the corrected reference output. But, in the case of restarting the power generation of the fuel cell, it is described in the meaning of the reference output (C in FIG. 4) required for restarting the power generation of the fuel cell, and in the case of stopping the power generation of the fuel cell, it is described in the meaning of the reference output (D of FIG. 4) required for stopping the power generation of the fuel cell.

Then, in the method for controlling a fuel cell of a fuel cell vehicle according to the present disclosure, when it is determined that it is required to restart or stop the power generation of the fuel cell, the integral value is calculated by integrating the difference between the required output of the vehicle and the corrected reference output during the time when the power generation of the fuel cell is restarted or stopped (S331, S332).

This will be described with reference to FIG. 4. In FIG. 4, the regions E and F show that the output voltage of the fuel cell is out of a stable state.

More specifically, the region E denotes a state in which the power generation of the fuel cell is restarted and the output voltage is excessive, and the region F denotes a state in which the power generation of the fuel cell is stopped and the output voltage is insufficient. Therefore, the time during which the E region is maintained refers to the time (I) at which the power generation of the fuel cell is restarted, and the time during which the F region is maintained refers to the time (J) at which the power generation of the fuel cell is stopped.

In addition, G denotes the integral value obtained by integrating the difference between the required output of the vehicle and the corrected reference output during the time (I) at which the power generation of the fuel cell is restarted. H denotes the integral value obtained by integrating the difference between the required output of the vehicle and the corrected reference output during the time (J) at which the power generation of the fuel cell is stopped. For reference, the integral values denoted by G and H here are the values obtained by multiplying the output voltage of the fuel cell by the time, and refer to the output amount or output energy of the fuel cell.

Finally, the method for controlling a fuel cell of a fuel cell vehicle according to the present disclosure restarts or stops the power generation of the fuel cell based on the calculated integral value (S341, S342, S343, and S344).

Accordingly, unlike the conventional art that determines whether to stop and restart the power generation of the fuel cell based on a certain reference value, since the state of the power generation of the fuel cell is determined based on the output energy of the fuel cell (integral values denoted by G and H in FIG. 4), there is an effect that can minimize the unnecessary stop or restart of the power generation of the fuel cell.

Assuming such an understanding, it will be examined more specifically. In the steps (S321, S322, S323, S324) of determining whether it is required to restart or stop the power generation of the fuel cell of the method for controlling a fuel cell of a fuel cell vehicle according to the present disclosure, it may be determined that it is required to restart the power generation of the fuel cell when the fuel cell is in the stopped state but the required output of the vehicle is greater than the corrected reference output (S321, S322). In addition, when the fuel cell is in the driving state but the required output of the vehicle is less than the corrected reference output, it may be determined that the it is required to stop the power generation of the fuel cell (S321, S323).

In addition, in the steps (S341, S342, S343, and S344) of restarting or stopping the power generation of the fuel cell of the method for controlling a fuel cell of a fuel cell vehicle according to the present disclosure, when the calculated integral value is greater than a preset first reference value, the power generation of the battery is restarted, and when the calculated integral value is less than the preset first reference value, it may re-determine whether the power generation of the fuel cell needs to be restarted or stopped (S341 and S342).

Here, the preset first reference value refers to the minimum output energy required for restarting the fuel cell, and may be understood to refer to an experimental value derived through a number of experiments.

In addition, in the steps (S341, S342, S343, S344) of restarting or stopping the power generation of the fuel cell of the method for controlling a fuel cell of a fuel cell vehicle according to the present disclosure, when the calculated integral value is less than a preset second reference value, the power generation of the fuel cell is stopped, and when the calculated integral value is greater than the preset second reference value, it may re-determine whether it is required to restart or stop the power generation of the fuel cell (S343, S344).

Here, the preset second reference value refers to the maximum value of the output energy required for stopping the fuel cell, and may be understood to refer to an experimental value derived through a number of experiments.

That is, in the method for controlling a fuel cell of a fuel cell vehicle according to the present disclosure, the step (S300) of restarting or stopping the power generation of the fuel cell based on the corrected reference output may be repeatedly performed according to the result of comparing the integral value with the preset first reference value or the preset second reference value, and the resulting integral values may be accumulated.

Accordingly, in the steps (S321, S322, S323, S324) of determining whether it is required to start or stop the power generation of the fuel cell of the method for controlling a fuel cell of a fuel cell vehicle according to the present disclosure, when it is determined that it is not required to restart or stop the power generation of the fuel cell, the integral value derived in the step of calculating the integral value may be initialized (S324). As a result, it is possible to prevent a situation in which the integral value is accumulated excessively, and there is an effect that the stability of the control is improved.

The fuel cell vehicle of the present disclosure may, e.g., comprise one or more components or complete systems of fuel cell vehicles as disclosed in one or more of U.S. Published Patent Application 2020/0369165; U.S. Published Patent Application 2022/0194235; and/or U.S. Published Patent Application 2022/0194234.

Therefore, as described above, according to the method for controlling a fuel cell of a fuel cell vehicle of the present disclosure, by stopping or restarting the power generation of the fuel cell by reflecting the degree of deterioration of the fuel cell, the rate of the degradation of the fuel cell can be minimized, thereby improving the performance and lifespan of the fuel cell. In addition, by stopping or restarting the power generation of the fuel cell based on the integral value of integrating the difference between the required output of the vehicle and the corrected reference output, there is an advantage in that the durability and efficiency of the fuel cell can be improved by minimizing unnecessary stop and restart.

Although shown and described in relation to specific embodiments of the disclosure, it will be apparent to those of ordinary skill in the art that the present disclosure can be variously improved and changed without departing from the spirit of the present disclosure provided by the following claims.

What is claimed is:

1. A method for controlling a fuel cell of a fuel cell vehicle, comprising:

determining a reference output required for restarting or stopping power generation of a fuel cell according to a required output of a vehicle;

correcting the reference output based on vehicle driving condition information and degree of degradation of the fuel cell; and restarting or stopping the power generation of the fuel cell based on the corrected reference output;

wherein the restarting or stopping the power generation of the fuel cell comprises:

determining whether it is required to restart or stop the power generation of the fuel cell according to a driving state of the fuel cell and a difference between the required output of the vehicle and the corrected reference output;

calculating an integral value by integrating the difference between the required output of the vehicle and the corrected reference output during a time when the power generation of the fuel cell is restarted or stopped when it is determined that it is required to restart or stop the power generation of the fuel cell; and restarting or stopping the power generation of the fuel cell based on the calculated integral value.

2. The method according to claim 1, wherein the determining the reference output comprises:

determining the reference output required for restarting or stopping the power generation of the fuel cell based on a first data map prepared in advance according to the required output of the vehicle.

3. A method for controlling a fuel cell of a fuel cell vehicle, comprising:

determining a refer e output required for restarting or stopping power generation of a fuel cell according to a required output of a vehicle;

correcting the reference output based on vehicle driving condition information and degree of degradation of the fuel cell; and restarting or stopping the power generation of the fuel cell based on the corrected reference output;

wherein the correcting the reference output comprises:

determining a correction value of the reference output based on the vehicle driving condition information comprising vehicle altitude and coolant temperature and the degree of degradation of the fuel cell; and correcting the reference output based on the determined correction value;

wherein the correction value of the reference output required for restarting the power generation of the fuel cell is determined based on Equation 1 below:

$$\text{Correction value of reference output required for restarting power generation of fuel cell} = \frac{X \times Z}{Y} \qquad \text{Equation 1}$$

$$X = \frac{1}{\text{Atmospheric pressure (atm) according to vehicle altitude}}$$

-continued $$Y = \frac{\text{Target temperature of coolant (° C.)}}{\text{Current temperature of coolant (° C.)}}$$

$Z$ = Determination factor of degree of degradation of fuel cell (V).

4. The method according to claim 3, wherein the correction value includes a first correction value of the reference output required for restarting the power generation of the fuel cell and a second correction value of the reference output required for stopping the power generation of the fuel cell, wherein the first correction value and the second correction value are individually determined.

5. The method according to claim 3, wherein the correcting the reference output further comprises:

calculating a determination factor of the degree of degradation of the fuel cell based on a data map of an output voltage prepared in advance according to an output current of the fuel cell.

6. The method according to claim 5, wherein the correcting the reference output comprises:

comparing the output voltage based on the data map of the output voltage prepared in advance with an actual output voltage of the fuel cell; and when the actual output voltage of the fuel cell is lower than the output voltage based on the data map of the output voltage prepared in advance, calculating the determination factor of the degree of degradation of the fuel cell by calculating a rate of the actual output voltage of the fuel cell to the output voltage based on the data map of the output voltage prepared in advance.

7. The method according to claim 6, wherein the correcting the reference output comprises:

increasing a number of counts each time the actual output voltage of the fuel cell is lower than the output voltage based on the data map of the output voltage prepared in advance;

for each count, calculating and summing a ratio of the actual output voltage of the fuel cell to the output voltage based on the data map of the output voltage prepared in advance; and when the number of counts reaches a preset reference number, calculating the determination factor of the degree of degradation of the fuel cell by dividing a summation result by the number of counts.

8. A method for controlling a fuel cell of a fuel cell vehicle comprising:

determining a reference output required for restarting or stopping power generation of a fuel cell according to a required output of a vehicle;

correcting the reference output based on vehicle driving condition information and degree of degradation of the fuel cell; and restarting or stopping the power generation of the fuel cell based on the corrected reference output;

wherein the correcting the reference output comprises:

determining a correction value of the reference output based on the vehicle driving condition information comprising vehicle altitude and coolant temperature and the degree of degradation of the fuel cell, and correcting the reference output based on the determined correction value;

wherein the correction value of the reference output required for stopping the power generation of the fuel cell is determined based on Equation 2 below:

$$\text{Correction value of reference output required for stopping power generation of fuel cell} = \frac{1}{Y \times Z} \qquad \text{Equation 2}$$

$$Y = \frac{\text{Target temperature of coolant (° C.)}}{\text{Current temperature of coolant (° C.)}}$$

$Z$ = Determination factor of degree of degradation of fuel cell (V).

9. The method according to claim 8, wherein the correcting the reference output comprises:

calculating a determination factor of the degree of degradation of the fuel cell based on a data map of an output voltage prepared in advance according to an output current of the fuel cell.

10. The method according to claim 1, wherein the correcting the reference output comprises:

initializing the corrected reference output when the corrected reference output is out of a preset reference range.

11. The method according to claim 1, wherein the determining whether it is required to start or stop the power generation of the fuel cell comprises:

when the fuel cell is in a stopped state but the required output of the vehicle is greater than the corrected reference output, determining it is required to restart the power generation of the fuel cell; and when the fuel cell is in a driving state but the required output of the vehicle is less than the corrected reference output, determining that it is required to stop the power generation of the fuel cell.

12. The method according to claim 11, wherein the determining whether it is required to restart or stop the power generation of the fuel cell comprises:

when it is determined that it is not required to restart or stop the power generation of the fuel cell, initializing the integral value derived from the calculating the integral value.

13. The method according to claim 1, wherein the determining whether it is required to restart or stop the power generation of the fuel cell comprises:

restarting the power generation of the fuel cell when the calculated integral value is greater than a preset first reference value; and redetermining whether it is required to restart or stop the power generation of the fuel cell when the calculated integral value is less than the preset first reference value.

14. The method according to claim 1, wherein the restarting or stopping the power generation of the fuel cell comprises:

stopping the power generation of the fuel cell when the calculated integral value is less than a preset second reference value; and redetermining whether it is required to restart or stop the power generation of the fuel cell when the calculated integral value is greater than the preset second reference value.

15. The method according to claim 1, wherein the correction value includes a first correction value of the reference output required for restarting the power generation of the fuel cell and a second correction value of the reference output required for stopping the power generation of the fuel cell, wherein the first correction value and the second correction value are individually determined.

16. The method according to claim 8, wherein the correction value includes a first correction value of the reference output required for restarting the power generation of the fuel cell and a second correction value of the reference output required for stopping the power generation of the fuel cell, wherein the first correction value and the second correction value are individually determined.

17. The method according to claim 3, wherein the correcting the reference output comprises initializing the corrected reference output when the corrected reference output is out of a preset reference range.

18. The method according to claim 8, wherein the correcting the reference output comprises initializing the corrected reference output when the corrected reference output is out of a preset reference range.

* * * * *